(12) United States Patent
Griffin et al.

(10) Patent No.: US 11,356,427 B1
(45) Date of Patent: Jun. 7, 2022

(54) SIGNCRYPTED ENVELOPE MESSAGE

(71) Applicant: Wells Fargo Bank, N.A., San Francisco, CA (US)

(72) Inventors: Phillip H. Griffin, Raleigh, NC (US); Jeffrey J. Stapleton, Arlington, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 713 days.

(21) Appl. No.: 15/669,713

(22) Filed: Aug. 4, 2017

Related U.S. Application Data

(60) Provisional application No. 62/459,407, filed on Feb. 15, 2017.

(51) Int. Cl.
*H04L 9/32* (2006.01)
*H04L 9/40* (2022.01)
*H04L 9/30* (2006.01)

(52) U.S. Cl.
CPC .......... *H04L 63/045* (2013.01); *H04L 9/3013* (2013.01); *H04L 9/3247* (2013.01); *H04L 63/123* (2013.01); *H04L 63/126* (2013.01); *H04L 2209/72* (2013.01)

(58) Field of Classification Search
CPC ..... H04L 2209/72; H04L 9/0825; H04L 9/14; H04L 9/3247; H04L 63/045; H04L 63/0428
See application file for complete search history.

(56) References Cited

U.S. PATENT DOCUMENTS

| | | | |
|---|---|---|---|
| 4,578,530 | A | 3/1986 | Zeidler |
| 5,610,982 | A | 3/1997 | Micali |
| 5,825,880 | A | 10/1998 | Sudia et al. |
| 5,995,625 | A | 11/1999 | Sudia et al. |
| 6,144,739 | A | 11/2000 | Witt et al. |
| 6,396,928 | B1 * | 5/2002 | Zheng ................. H04L 9/3247 380/285 |

(Continued)

OTHER PUBLICATIONS

Aye et al. "New Hybrid Signcryption Scheme with Digital Envelope", International Confrerence on Advances in Engineering and Technology (ICAET 2014), Mar. 29, 2014. 4 pgs. (Year: 2014).*

(Continued)

*Primary Examiner* — Zachary A. Davis
(74) *Attorney, Agent, or Firm* — Foley & Lardner LLP

(57) ABSTRACT

Various embodiments relate to a method performed by a processor of a computing system. An example method includes generating a symmetric content encryption key. Content is encrypted using the content encryption key to generate cipher text. A hash of the cipher text is generated. Each of the hash and the content encryption key is signcrypted using each of a signcrypting party public key, a signcrypting party private key and a recipient public key to generate a signcrypted envelope message. The cipher text is embedded in a component of the signcrypted envelope message. The signcrypted envelope message is transmitted to a recipient. The recipient can designcrypt the signcrypted envelope message using each of the recipient public key, a recipient private key, and the signcrypting party public key to retrieve the content encryption key and hash of the cipher text. The recipient can decrypt the cipher text using the content encryption key.

18 Claims, 7 Drawing Sheets

(56) References Cited

U.S. PATENT DOCUMENTS

| | | |
|---|---|---|
| 6,560,581 B1 | 5/2003 | Fox et al. |
| 7,113,594 B2 | 9/2006 | Boneh et al. |
| 7,162,635 B2 | 1/2007 | Bisbee et al. |
| 8,200,760 B2 | 6/2012 | Jacobs |
| 8,316,237 B1 | 11/2012 | Felsher et al. |
| 8,447,036 B2 | 5/2013 | Jho et al. |
| 8,448,719 B2 | 5/2013 | Furukawa |
| 8,572,682 B2 | 10/2013 | Karabulut |
| 8,818,903 B2 | 8/2014 | Dulin et al. |
| 8,892,475 B2 | 11/2014 | Tallent et al. |
| 9,191,208 B2* | 11/2015 | Yagisawa ............... H04L 9/3066 |
| 9,401,811 B2 | 7/2016 | Asim et al. |
| 2002/0073311 A1 | 6/2002 | Futamura et al. |
| 2002/0091922 A1 | 7/2002 | Shrader et al. |
| 2004/0158708 A1 | 8/2004 | Peyravian et al. |
| 2013/0305048 A1* | 11/2013 | Yao ....................... H04L 9/3073 |
| | | 713/168 |
| 2016/0203496 A1 | 7/2016 | Guerrero et al. |
| 2016/0330027 A1 | 11/2016 | Ebrahimi |

OTHER PUBLICATIONS

Chkraborty et al. "Introduction to Signcryption". University of Birmingham. 2004. 17 pgs (Year: 2004).*

Zheng. "Signcryption and Its Applications in Efficient Public Key Solutions", 1997 Information Security Workshop (ISW 97). 23 pgs (Year: 1997).*

"Information technology—Security techniques—Signcryption", International Standard ISO/IEC 29150. First Edition, Dec. 15, 2011. 60 pgs (Year: 2011).*

Smart Card Alliance. (2014) Technologies for Payment Fraud Prevention: EMV, Encryption and Tokenization. Princeton Junction, NJ, Publication No. PC-14002.

American National Standard for Financial Services, "ANSI X9.73-2020, Cryptographic Message Syntax (CMS)", Sep. 28, 2017, pp. 1-115.

Griffin, Phillip H., "Privacy Preserving Blockchains", ISSA Journal, Jun. 2019, pp. 26-33.

International Telecommunication Union, "Series X: Data Networks, Open System Communications and Security, OSI applications—Generic applications of ASN.1"X.894 Corrigendum 1, Mar. 2019, pp. 1-22.

Fips Pub 186, Digital Signature Standard (DSS), Federal Information Processing Standards Publication, Computer Systems Laboratory, Gaithersburg, MD, May 19, 1994.

Digital Signatures using Reversible Public Key Cryptography for the Financial Services Industry (rDSA), X9.31-1998, American National Standards institute, Sep. 9, 1998.

X9-Financial Services, X9.62-1998 American National Standards Institute, Sep. 20, 1998.

* cited by examiner

502 EMPLOYMENT APPLICATION

Company: ABC Corporation

Name: John Doe

Date of Birth: 1/1/1990

SSN: 123-45-6789

Form #/Generated: #464, 01/12/16

Comments: John Doe shows excellence in.....

502' EMPLOYMENT APPLICATION

Company: ABC Corporation

Name: 695165ewc/http//:tsp1.com/request

Date of Birth: iounioundfiuhttp//:tsp1.com/request

SSN: 3094042310809http//:tsp1.com/request

Form #/Generated: #464, 01/12/16

Comments: ysdv76123uibsd837246ybi9832ybr7b3489//:tsp1.com/request

SIGNCRYPTED ENVELOPE MESSAGE

CROSS-REFERENCE TO RELATED APPLICATION

This application claims priority to U.S. Provisional Patent Application No. 62/459,407 entitled "Signcrypted Envelope Message" filed Feb. 15, 2017 and is hereby incorporated by reference in its entirety.

BACKGROUND

As computer-based technologies have evolved, conventional in-person and paper-based transactions and communications are increasingly performed electronically over networks (e.g., the internet). Although electronic communications have significantly reduced costs and improved efficiencies, they pose significant risks regarding identification and authentication of signing parties, integrity of data, and confidentiality.

An electronic signature ("e-signature") refers to data in electronic form that is associated with a record and that is used by a signatory or signcrypting party to sign the record. An e-signature is intended to provide a secure and accurate identification method for the signatory to provide a seamless transaction to a relying party. Definitions of e-signatures vary depending on the applicable jurisdiction. For example, the United States is governed under the Electronic Signatures in Global and National Commerce Act ("ESIGN") and the Government Paperwork Elimination Act ("GPEA"). Under the ESIGN an e-signature is defined as an electronic sound, symbol, or process, attached to or logically associated with a contract or other record and executed or adopted by a person with the intent to sign the record. Additionally under United States federal law, the GPEA further defines the term "electronic signature" to mean a method of signing an electronic message that: (A) identifies and authenticates a particular person as the source of the electronic message; and (B) indicates such person's approval of the information contained in the electronic message. Increasingly, digital signatures are used in e-commerce and in regulatory filings to implement electronic signature in a cryptographically protected way.

Digital signatures are mathematical schemes for demonstrating the data integrity and origin authenticity of digital messages or electronic documents. A variety of cryptographic techniques are used to encrypt data and to create digital signatures. With symmetric key cryptographic systems, a pair of users who desire to exchange data securely use a shared "symmetric" key. With this type of approach, a sender of a message uses the same key to encrypt the message that a recipient of the message uses to decrypt the message. Symmetric key systems require that each sender and recipient establish the shared key in a secure manner. Public key systems may also be used to exchange messages securely. With public-key cryptographic systems, two types of keys are used—public keys and private keys. A sender of a message may encrypt the message using the public key of a recipient. The recipient may use a corresponding private key to decrypt the message.

Additionally, public key cryptographic systems (e.g., asymmetric key cryptographic systems) may be used to produce digital signatures. A recipient of a message that has been digitally signed can use the digital signature to verify the identity of the message sender and to confirm that the message has not been altered during transit. In a typical digital signature arrangement, a sender uses a cryptographic hash function to produce a hash (e.g., message digest). The hash is much smaller than the original message, but is still relatively unique to the message. The sender then uses its private key to generate the digital signature using the hash. The process of signing the message uses a mathematical operation that can only be performed by the sender who possesses the private key. The message and the "digital signature" can then be sent to a recipient. As will be appreciated, the recipient (e.g., the relying party) is an entity that can use the digital signature and the message sender's public key (e.g., encapsulated in a certificate) to determine that the sender is the message signer and that the integrity and origin authenticity of the message has not been compromised.

Today, information is more likely to be accessed by individuals from a cloud-based system using mobile and wireless devices. These devices may be personally owned, outside of the administrative control of an organization, and immune to its security and privacy policies. If these devices are lost or stolen, it may not be possible for an organization to erase the business critical information they might contain, such as customer and supplier contacts, bid and proposal data, or intellectual property. These factors all increase risk to the organization and its business-critical and sensitive information. While greater mobility and access to information from anywhere are benefits of using personally-owned mobile devices, there is a growing concern and need for data protection as organizations rely on public networks to exchange and access sensitive information. As transactions, interactions, and communications occur over various internet-centric services, the protection of sensitive information needs to be efficient and effective, providing assurance of the identity of the party while not compromising any sensitive information or slowing down information exchange processes with heavy (e.g., processor-intensive) protection mechanisms.

SUMMARY

Various embodiments relate to a method performed by a processor of a computing system. An example method includes generating a symmetric content encryption key. Content is encrypted using the content encryption key to generate cipher text. A hash of the cipher text is generated. Each of the hash and the content encryption key is signcrypted using each of a signcrypting party public key, a signcrypting party private key and a recipient public key to generate a signcrypted envelope message. The cipher text is embedded in a component of the signcrypted envelope message. The signcrypted envelope message is transmitted to a recipient. The recipient can unsigncrypt the signcrypted envelope message using each of the recipient public key, a recipient private key, and the signcrypting party public key to retrieve the content encryption key and the hash of the cipher text. The recipient can decrypt the cipher text in the component of the signcrypted envelope message using the content encryption key. The origin authenticity of the cipher text can be determined by the recipient using each of the signcrypting party public key and the recipient public and private keys, and data integrity of the cipher text and the content encryption key can be verified via the hash of the cipher text.

Various embodiments relate to a method performed by a processor of a recipient computing system. An example method includes receiving a signcrypted envelope message from a signcrypting party. The signcrypted envelope message comprises a hash and a content encryption key. The hash and content encryption key were signcrypted using each of a signcrypting party public key, a signcrypting party private key, and a recipient public key to generate the signcrypted envelope message. A cipher text is embedded in a component of the signcrypted envelope message. The cipher text is generated by using a content encryption key to encrypt content, and the hash being a hash of the cipher text. The signcrypted envelope message is unsigncrypted using each of the recipient public key, a recipient private key, and the signcrypting party public key to retrieve the content encryption key and the cipher text. The origin authenticity integrity of the cipher text can be determined by the recipient using each of the signcrypting party public key and the recipient public and private keys, and wherein origin authenticity integrity of the cipher text can be determined by the recipient using each of the signcrypting party public key and the recipient public and private keys, and wherein data integrity of the cipher text and the content encryption key can be verified via the hash of the cipher text. The cipher text is decrypted with the content encryption key to retrieve the content.

Various other embodiments relate to a method performed by a processor of a service provider computing system. The method includes receiving a file and a redaction service call. The redaction service call includes selected file content and access information. A content encryption key is generated. A manifest is generated that includes the selected file content, and the content encryption key. The selected file content in encrypted with the content encryption key to generate cipher text. A hash of the cipher text is generated. Each of the hash and the content encryption key is signcrypted using each of a signcrypting party public key, a signcrypting party private key and a recipient public key to generate a signcrypted envelope message. The cipher text is embedded in a component of the signcrypted envelope message. The signcrypted envelope message is transmitted to a recipient. The recipient can unsigncrypt the signcrypted envelope message using each of the recipient public key, a recipient private key, and the signcrypting party public key to retrieve the content encryption key and the hash of the cipher text. The recipient can decrypt the cipher text in the component of the signcrypted envelope message using the content encryption key. The origin authenticity integrity of the cipher text can be determined by the recipient using each of the signcrypting party public key and the recipient public and private keys, and wherein data integrity of the cipher text and the content encryption key can be verified via the hash of the cipher text.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIGS. 5A-C illustrate an employment application at various instances through the generation of a signcrypted envelope message, according to an example embodiment.

Figure 1:
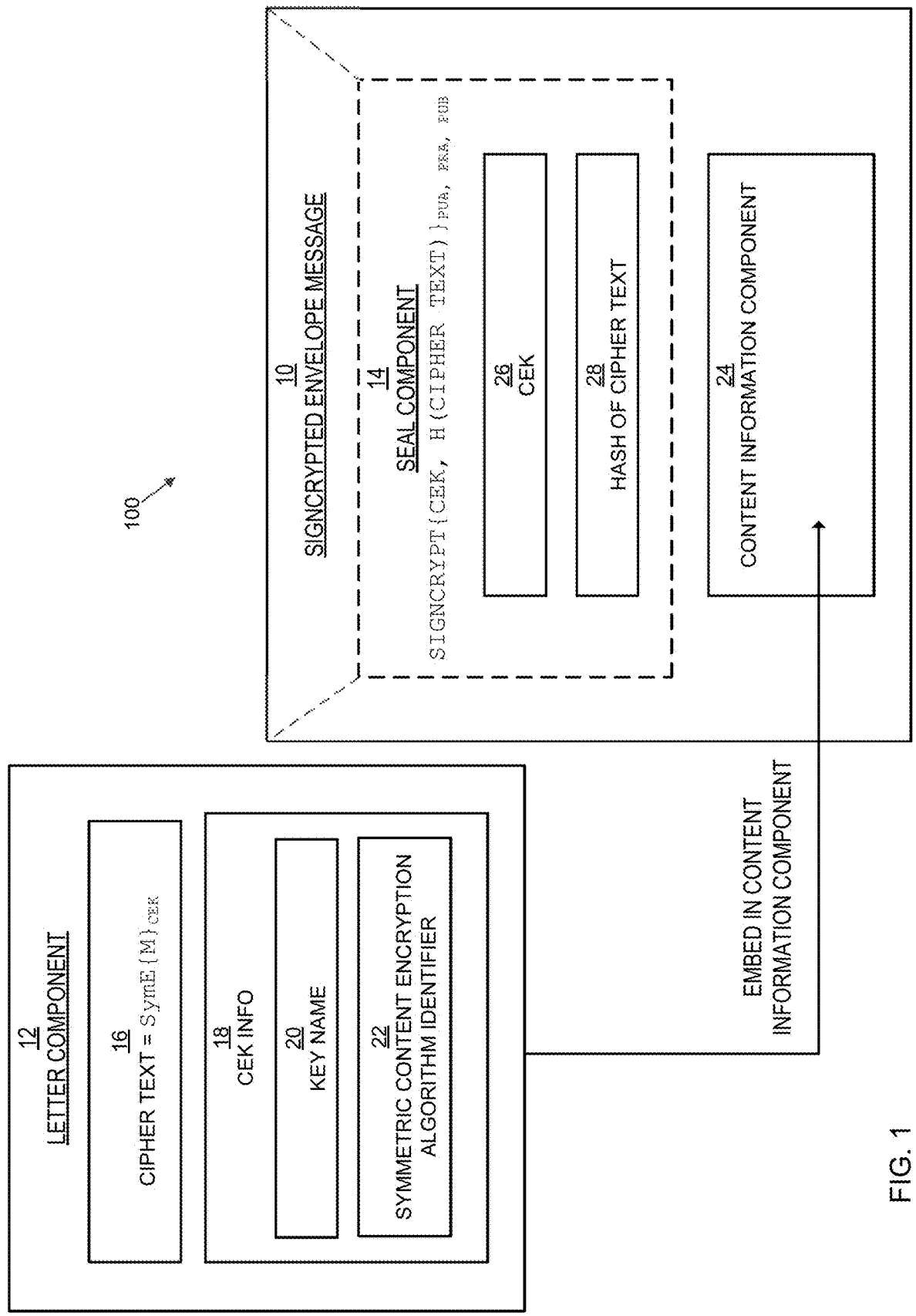
FIG. 1 is a block diagram of a signcrypted envelope message, according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Signcryption is a hybrid cryptographic primitive that utilizes an asymmetric encryption scheme and a digital signature scheme combined in a specific way, along with specially developed algorithms to perform both encryption and digital signature functions simultaneously (e.g., signcrypted or signcryption). This efficient cryptographic technique provides data integrity, origin authentication, and data confidentiality in a single operation. Some versions of signcryption algorithms provide non-repudiation. By utilizing signcryption, a signcrypted envelope message protects the confidentiality and data integrity of the signcrypting party's content during transfer and storage. The signcrypted envelope message processing system and a signcrypted envelope message allows a recipient to validate the information and decrypt the content in the signcrypted envelope message. As will be appreciated, the recipient may be an end user, a service provider, an intermediary computing system, a messaging entity, and the like.

Various embodiments described herein relate to systems and methods for a signcrypted envelope message processing system for creating and verifying a signcrypted envelope message. Various embodiments also relate to a new mode of SigncryptedData processing called signcrypted-envelope, which is utilized by the signcrypted envelope message processing system. The signcrypted-envelope mode utilizes an efficient hybrid cryptography technique based on the signcryption cryptographic primitive. More specifically, the signcrypted-envelope mode integrates symmetric key cryptography for integrating large amounts of bulk data with asymmetric cryptography for signcrypting (simultaneously signing and encrypting) a small amount of data (e.g., a symmetric encryption key) for a single message recipient. Accordingly, the signcrypted-envelope enables efficient transfer of the encrypted data and its encryption key to multiple recipients, while protecting the confidentiality, data integrity, and origin authenticity of the signcrypted symmetric key.

According to various embodiments, the signcrypted envelope message processing system utilizes a content encryption key ("CEK") and symmetric encryption in tandem with signcryption to generate a signcrypted envelope message. In the signcrypted-envelope mode, sensitive bulk content is encrypted once for every message recipient using the symmetric CEK to generate cipher text. The cipher text is embedded in a per-recipient component of the signcrypted envelope message. For each recipient, the signcrypting party signcrypts the CEK using the signcrypting party's public/private key pair and a public key of the recipient. In some embodiments, the signcrypting party also signcrypts a hash of the cipher text for each recipient. Each recipient unsigncrypts the signcrypted envelope message to retrieve the CEK needed to decrypt the content encrypted under the CEK. Using signcryption via the signcrypted-envelope mode provides confidentiality, data integrity, origin authenticity, and non-repudiation of the transmitted content.

By way of analogy, much like a physical envelope, the signcrypted envelope message consists of digital versions of a letter component and a seal component. The letter component includes content of any size or type that has been encrypted with a CEK using symmetric encryption to generate a cipher text. The encrypted content is the sensitive information that the signcrypting party is trying to protect during transmission to one or more recipients. The letter component is not signcrypted, but rather is embedded in a content component of the signcrypted envelope message and is "protected" by the seal component. The seal component is the CEK and hash of the cipher text signcrypted using a signcrypting party public/private key pair, and a recipient public key. The recipient can "open the seal" by unsigncrypting the signcrypted envelope message using each of the recipient public key, a recipient private key, and the signcrypting party public key to retrieve the CEK and the cipher text. The seal component allows the recipient to determine origin authenticity of the signcrypting party by performing certificate path validation to gain assurance that the signcrypting party's public key certificate is trusted.

As will be appreciated, the signcrypted envelope message processing system may be used to create and verify signcrypted envelope messages in connection with secure communications, document transfers, e-commerce transactions or other types of signing events, such as those involving cloud-based or blockchain-based distributed ledgers or smart contract systems, for example.

The signcrypted envelope message processing system provides technical solutions to computer-centric and internet-centric problems associated with conventional message systems. For example, one challenge associated with encrypting bulk content to be transferred securely to multiple recipients is that doing so conventionally requires substantial processing power and memory. For example, asymmetric encryption is strong, but requires substantial processing power compared to symmetric key encryption. Therefore, it may be it may be impractical to encrypt repeatedly bulk content using asymmetric encryption techniques, such as signcryption. Doing so would also require more processing power (and therefore time) and substantial memory to store each instance of the encrypted data. According to various embodiments, the signcrypted envelope message processing system, using the signcrypted-envelope processing mode, overcomes these challenges by first encrypting the bulk content using a symmetric CEK and, for each recipient, signcrypting the CEK using the public key of the recipient. A signcrypted envelope message including the encrypted content and the signcrypted CEK is sent to each recipient. Each recipient can then recover the signcrypted CEK in order to decrypt the bulk content.

Because the content is symmetrically encrypted and stored in a content component in the signcrypted envelope message, the signcrypted envelope message processing system allows for content to be relatively large, a feature not practical through asymmetric cryptographic techniques alone as the large content would have to be repeatedly asymmetrically encrypted for multiple recipients. In this way, the signcrypted envelope messages provide shorter cipher text and/or lower computational cost, making it ideal for protecting sensitive information in environments with bandwidth limitations (e.g., wireless mobile devices), transmitting high volumes of transactions (e.g., Internet commerce), or addressing size or cost of storage issues (e.g., smart cards).

The signcrypted envelope message processing system also simplifies key management compared to existing systems. For example, the signcrypted envelope message processing system requires only a single key pair for each communicating party. In contrast, traditional sign-then-encrypt schemes require two key pairs for each communicating party. With this approach, message processing performance is improved, there are fewer keys to manage, and the need to establish a shared secret with a recipient is eliminated. Also, the signcrypted envelope message processing system results in a much smaller message that is fast to process in transmission and in unsigncryption and verification. In addition, signcrypted envelope message processing system can provide non-repudiation, which is not possible in current systems.

In addition, coupling of the cipher text, hash of the cipher text and CEK with the signcrypting party's public-private key pair makes unauthorized replay (e.g., impersonation) of the signcrypted envelope message incredibly difficult, as a unauthorized party would need both the CEK, the content, and the signcrypting party public and private keys. In some embodiments, the signcrypted envelope message processing system utilizes a signed attributes feature to provide for an easy and lightweight mechanism to bind additional information to the encrypted content. The signcrypted envelope message processing system's use of additional attributes avoids complicating certificate issuance and management of processes by allowing the signcrypting party to add this information regarding certificate extension payload as a signed attribute. The ability to add attributes of any kind or any format makes signcrypted envelope message a very flexible and adaptable electronic signature mechanism. In this way, the signcrypted envelope message processing system can replace the use of authenticated encryption techniques that produce large messages that require long processing times with an efficient hybrid cryptography technique based on the signcryption cryptographic primitive.

These problems arise out of the use of computers and the Internet, because each problem involves processing power, bandwidth requirements, storage requirements, and information security, each of which is inherent to the use of computers and the Internet. The problems also arise out of the use of computers and the internet, because online communications, transactions, and payment services, and the ability to properly authenticate a signcrypting party in an online communication, cannot exist without the use of computers and the Internet.

Referring to FIG. 1, a block diagram of a signcrypted envelope message 10 is illustrated, according to an example embodiment. The signcrypted envelope message 10 may be one generated, for example, using the method 200 of FIG. 2 described below. As shown in FIG. 1, the signcrypted envelope message 10 includes a letter (e.g., an analogous digital equivalent) component 12 embedded in a content information component 24 and a seal (e.g., an analogous digital equivalent) component 14. The letter component 12 protects and stores the content through symmetric encryption. As will be appreciated, the seal component 14 is an output of a signcryption algorithm that simultaneously signs and encrypts a plurality of inputs. The seal component "protects" the encrypted content in the letter by encrypting and digitally signing the CEK that was used to encrypt the bulk content.

The letter component 12 includes cipher text 16 and optional CEK info 18. The cipher text 16 is generated by symmetrically encrypting ("SymE") the content ("M") using a CEK. A fresh CEK is generated for each signcrypted envelope message. By using symmetric encryption, the content can be encrypted once for use by multiple recipients because the content is encrypted and decrypted using the same CEK. In contrast, asymmetric encryption requires each recipient's public key. Therefore, if asymmetric encryption were used to encrypt the content, the content would have to be encrypted for each individual recipient. Because the content is symmetrically encrypted, a relatively large amount of content can be encrypted in an acceptable amount of time using modest processing and memory resources. In contrast, encrypting the content using asymmetric cryptographic techniques would be impractical, because the large content would have to be repeatedly encrypted for multiple recipients. The optional CEK info 18 includes a key name 20 and a symmetric content encryption algorithm identifier 22. The key name 20 allows for the signcrypting party to provide a name identifying the symmetric key. The symmetric content encryption algorithm identifier 22 allows for the signcrypting party to provide an identifier of the algorithm used to encrypt the content to generate the cipher text 16.

In some arrangements, the complete preparation of the letter component 12 is stored in the type NamedKeyEncryptedData with the cipher text 16, CEK info 18 and other information being stored in component of a value of type NamedKeyEncryptedData. In some arrangements, the encrypted content 16 is placed in the optional encryptedContent component and the name of the CEK 26 in the keyName component of a value of type NamedKeyEncryptedData. The letter component 12 is embedded in content information component 24 of the signcrypted envelope message 10.

The seal component 14 makes use of signcryption to digital sign and encrypt the CEK 26 and a hash of the cipher text 28 in a single cryptographic operation. The signcryption algorithm takes as input a plaintext (e.g., the CEK 26 and the hash of the cipher text 28), a signcrypting party's public ("PUA") and private ("PRA") key pair, a message recipient public key ("PUB"). The CEK 26 is the symmetric key used to encrypt the content and can be used by a recipient to decrypt the cipher text 16 and retrieve the content. The hash of cipher text 28 is generated by using a hash algorithm over the cipher text.

The signcrypted envelope message 10 is structured such that no information about the original data can be recovered (except possibly its length). The resulting signcrypted envelope message 10 is such that it cannot be used to generate a new seal component 14 by an unauthorized entity without detection from a recipient.

As mentioned above, various embodiments relate to a new mode of SigncryptedData processing called signcrypted-envelope, which is utilized by the signcrypted envelope message processing system 100 to create and process signcrypted envelope messages. In signcrypted-envelope mode, content of any type or format is encrypted under a symmetric key to create ciphertext for sharing with one or more message recipients. That symmetric key and a message digest of the ciphertext is signcrypted for the message recipients using the public-private keys of the sender and the public key of each recipient. The signcrypted keys and the symmetric key encrypted content are then sent to the recipients. A value of type SigncryptedData using signcrypted-envelope mode is created as follows:

1. The value of the version component of type SigncryptedData is set to 1.
2. In the contentInformation component of type SigncryptedData, set the value of mode to the signcrypted-envelope object identifier.
3. Using a fresh symmetric key (e.g., the CEK 26), encrypt content of any type or format and place the encrypted content (e.g., the cipher text 16) in the optional encryptedContent component of a value of type NamedKeyEncryptedData.
4. Complete preparation of a value of type NamedKeyEncryptedData, by optionally providing a name for the symmetric key (e.g., the CEK 26) in the keyName component, and identifying the symmetric content encryption algorithm and any parameters in the encryptedContentInfo component.
5. Embed the prepared value of type NamedKeyEncryptedData in the optional content component in the contentInformation component of type SigncryptedData.
6. Prepare a messageDigest attribute that identifies a message digest (hash) algorithm and contains a digest (hash) of the encryptedContent component of type NamedKeyEncryptedData.
7. Prepare a value of type ToBeSigncrypted that includes this messageDigest attribute in the attributes component, and the symmetric content encryption key (e.g., the CEK 26) in the contents component. The value of type ToBeSigncrypted is a value that will be signcrypted for each message recipient.
8. Optionally, include values in the certificates component of type SigncryptedData.
9. Optionally, include values in the crLs component of type SigncryptedData.
10. For each message recipient, include a value of type signcrypter in the signcrypters component of type SigncryptedData as follows:
   A. The value of the version component of type Signcrypter is set to 1.
   B. In the sids component of type signcrypter, set the components of a value of type SigncrypterIDs to identify the public-private key pairs of the message sender and recipient.
   C. Set the value of the signcryptedDataAlgorithm component of type Signcrypter to identify the signcryption algorithm and any associated parameters.
   D. Include the results of signcrypting the prepared value of type ToBeSigncrypted in the signcryptionValue component of type Signcrypter.
   E. The optional signatureInformation component of type Signcrypter should not be present.
   F. Optionally, include values in the unsigncryptionAttributes component of type Signcrypter.

To recover the plaintext from the SigncryptedData message, a message recipient should perform the following steps:

1. Search the list of per recipient values of type Signcrypter in the signcrypters component of type SigncryptedData to locate the recipient public-private key pair in the sids component of type Signcrypter.
2. Decode the optional content component (e.g., the cipher text 16) in the contentInformation component of type SigncryptedData, to recover a value of type NamedKeyEncryptedData from the octet string.

3. Unsigncrypt the value in the signcryptionValue component of type Signcrypter for a given recipient using their public-private key pair of the recipient and the public key of the sender to recover the signcrypted value of type ToBeSigncrypted that contains a symmetric key (e.g., the CEK 26) and a message digest (e.g., the hash of the cipher text 28) of the content encrypted using the symmetric key.

4. Perform certificate path validation to gain assurance that the sender public key certificate is trusted.

5. Verify that the symmetric key encrypted content has not been modified by computing a digest of the encryptedContent component of type NamedKeyEncryptedData using the algorithm in the message digest attribute recovered from the signcrypted value of type ToBeSigncrypted and comparing the two digests for equivalency.

6. Use the symmetric key recovered from unsigncrypting the value of type ToBeSigncrypted to decrypt the content value of the contentInformation component of type SigncryptedData.

Figure 2:
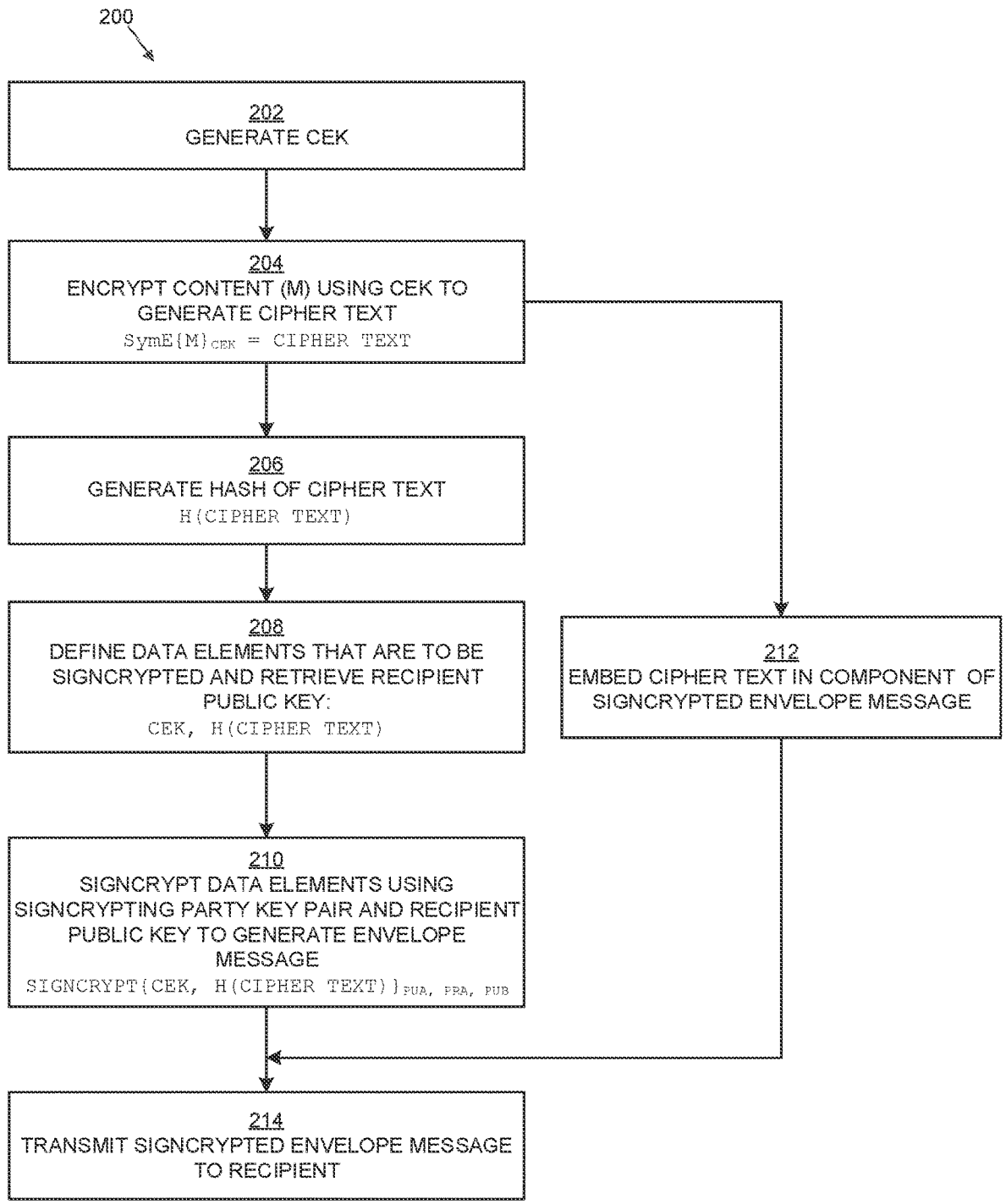
FIG. 2 is a flow diagram illustrating a method of generating a signcrypted envelope message, according to an example embodiment.

Referring to FIG. 2, a flow diagram illustrating a method 200 of generating a signcrypted envelope message is shown, according to an example embodiment. In some embodiments, the method 200 is an example implementation of the signcrypted-envelope mode described above. The method 200 involves binding and encrypting a CEK and hash of a cipher text under signcryption with cipher text embedded in a component of the signcrypted envelope message. The method 200 may be performed by a back-end system. The method 200 may be used to generate a signcrypted envelope message 10 described in FIG. 1. As shown in FIG. 2, the method 200 is performed by a signcrypting party. In some arrangements, the signcrypting party may be one that operates the signcrypting party computing system 302 of FIG. 3.

The method 200 begins when a signcrypting party generates a CEK at 202. According to various arrangements, a fresh CEK is generated for encryption particular content.

At 204, the signcrypting party uses a symmetric encryption algorithm ("SymE") to encrypt the content ("M") with the CEK generated at 202 to generate cipher text.

At 206, the signcrypting party generates a hash of the cipher text ("H(Cipher Text)"). The hash is generated using a suitable cryptographic hash algorithm. A cryptographic hash algorithm or hash function is a one-way function that takes an arbitrary input string and generates a fixed-length output. The resulting output can be referred to as a hash, as hash value, or a message digest. Small changes to the input data result in large, unpredictable changes to the hash value. Accordingly, the hash of the cipher text can be used to verify data integrity of the content.

At 208, the data elements that are to be signcrypted in the signcrypted envelope message are defined and the recipient public key is retrieved. As shown in FIG. 2, the CEK and hash of the cipher text are each to be signcrypted. The recipient public key is of a public/private key pair associated with an asymmetric encryption system. In some arrangements, the key pair is associated with a digital certificate in a public key infrastructure ("PKI"). In some arrangements, the recipient public key is retrieved from the authority that issued the key pair. In some arrangements, recipient public key is retrieved from a previous signcrypted envelope message generated using the recipient public key. In some arrangements, the recipient public key is retrieved in response to a request for the recipient public key transmitted from the signcrypting party to the recipient.

At 210, the CEK and hash of the cipher text defined at 208 are signcrypted to generate the signcrypted envelope message. The process includes the use of a signcryption algorithm. The input for the signcryption algorithm of the signcrypted envelope message includes: plaintext content (including at least the CEK and hash of the cipher text), the signcrypting party public and private key pair, and the recipient public key. The plaintext and resulting signcrypted envelope message are all bit strings The public and private keys and the option are determined by the particular implementation of a signcrypted envelope message mechanism (e.g., signcrypted envelope message-content, signcrypted envelope message-attributes, and signcrypted envelope message-components modes). In some arrangements, there are multiple recipients with each recipient having a unique recipient public key. In those arrangements, steps 210 and 214 must be completed for each recipient, using each recipient's unique public key at 210. In these arrangements, the recipient public key can be included in the attributes or fields of a signcrypted envelope message, allowing a digital signature verifier to use the included public key component to verify message integrity. In these arrangements, the verifier will be able to verify message integrity (e.g., that it has not been modified), but will not gain origin authenticity assurance (e.g., know who signed the message and who possessed the private key component of the key pair). In some arrangements, an lids component of a type Signcrypter sets the components of a value of type SigncrypterIDs to identify the public-private key pairs of the message sender and recipient.

In some arrangements, the signcrypted envelope message processing system executes a series of calculations to generate the signcrypted envelope message. Generally, this process includes generating a random prime number P of length $l_p$ and a random prime number Q of length $l_q$, such that Q is a prime factor of P−1. Subsequently, a random integer (U) from a series of [1, . . . , Q−1] is generated. A first value $F_1$ is determined using a modulus function with the recipient public key, the random number U, and the random prime number P. A second value $F_2$ is determined using a key derivation function and a broad support package ("BSP") in tandem with the inputs of $F_1$, the bit length of P, and the plaintext content. A third value, $F_3$, is determine using a hash function and a BSP in tandem with the inputs of $F_1$, the signcrypting party's public and private key pair, the bit length of P, and the plaintext content. The third value $F_3$ is further altered using a BSP with the inputs of $F_3$ and the bit length of Q. A fourth value, $F_4$, is determined using a BSP with the input of the bit length of Q and a modulus function with $_Q$, $_U$, $F_3$ and the signcrypting party's private key. A signcrypted envelope message is equal to $(F_2 \| F_3 \| F_4)$.

At 212, the cipher text generated at 204 is embedded in a component of the signcrypted envelope message. In some arrangements, the embedding occurs simultaneously with the signcryption at 210. In other arrangements, the cipher text is first stored in component of a value of type NamedKeyEncryptedData and the type NamedKeyEncryptedData is embedded in a component of the signcrypted envelope message. In other arrangements, the cipher text is placed in an optional encryptedContent component.

At 214, the signcrypted envelope message is transmitted to the recipient associated with the recipient public key used during signcryption at 210. The signcrypted envelope message is structured such that no information about the original data can be recovered (except possibly its length). The resulting signcrypted envelope message is formed so that it cannot be used to generate a cipher text or signcrypted "seal" by an unauthorized entity without detection from a recipient.

In some arrangements, the method 200 is used to generate multiple signcrypted envelope messages to multiple recipients. Generally, the encryption of the content using the CEK to generate the cipher text and generating a hash of the cipher text is the same for each recipient. However, the signcryption process is recipient-specific and must be performed separately for each recipient as each of the hash and the CEK is signcrypted using the signcrypting party public key, the signcrypting party private key and a recipient public key specific to the intended recipient of the signcrypted envelope message. For example, if there is a first recipient and a second recipient, the encryption of the content using the CEK to generate the cipher text and generating a hash of the cipher text are done. First, a first signcryption method is done over the hash and the CEK using the signcrypting party public key, the signcrypting party private key and the first recipient public key to generate a first signcrypted envelope message. Next, a second signcryption method is done over the hash and the CEK using the signcrypting party public key, the signcrypting party private key and the second recipient public key to generate a second signcrypted envelope message. The cipher text embedded in the content component of each signcrypted envelope message is the same; however, the signcrypted components (e.g., the digital signature and encryption) are specific to each of the first recipient and the second recipient. The first recipient can unsigncrypt the first signcrypted envelope message using each of the first recipient public key, the first recipient private key, and the signcrypting party public key to retrieve the CEK and the cipher text. As will be appreciated, the second recipient cannot unsigncrypt the first signcrypted envelope message as the second recipient does not have the first recipient's private key. In some arrangements, this method 200 is used to generate a single signcrypted envelope message that includes multiple CEKs, each being signcrypted using a public key of each recipient. In other arrangements, a single signcrypted envelope message includes multiple seals, each seal generated by signcrypting each of the hash and CEK using each respective recipient's public key. In those arrangements, a single CEK can be signcrypted once for each message recipient and the results are placed in the per-recipient attributes field of that recipient's SigncrypterInfo field of the signcrypted envelope message.

Figure 3:
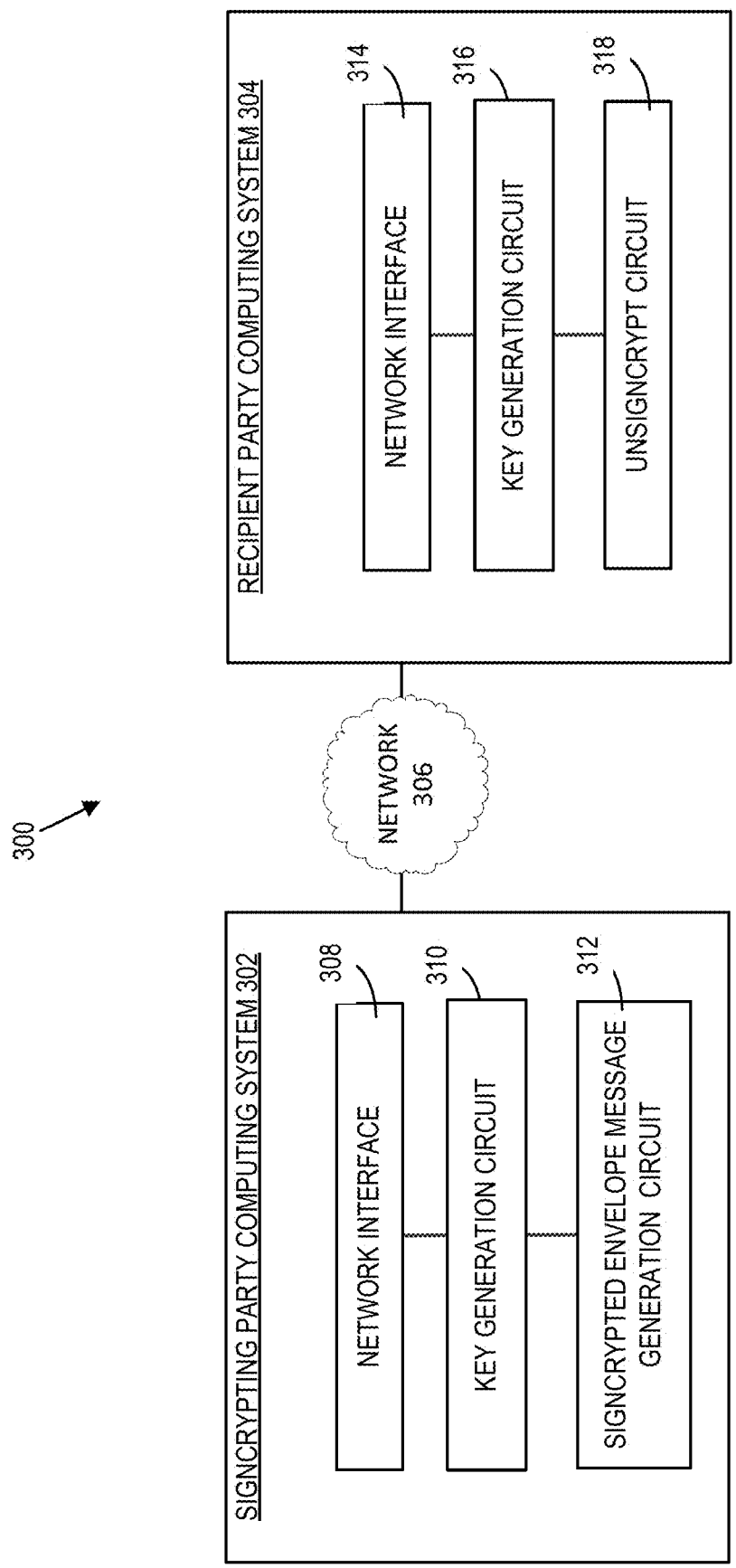
FIG. 3 is a schematic diagram of a signcrypted envelope message processing system, according to an example embodiment.

Referring to FIG. 3, a schematic diagram of a signcrypted envelope message processing system 300 is illustrated, according to an example embodiment. The signcrypted envelope message processing system 300 includes a signcrypting party computing system 302 and recipient party computing system 304. Each of the signcrypting party computing system 302 and the recipient party computing system 304 is in operative communication with the other via a network 306. The network 306 may include, for example, the Internet, cellular networks, proprietary cloud networks, the internet of things, and the like. In general, the signcrypted envelope message processing system 300 is used to generate and verify signcrypted envelope messages via the signcrypted-envelope mode. Specifically, the signcrypted envelope message processing system 300 makes it possible to symmetrically encrypt bulk content in an acceptable amount of time using modest processing and memory resources by using the signcrypted-envelope mode. In the signcrypted-envelope mode sensitive bulk content is encrypted once for every message recipient using the symmetric CEK to generate cipher text.

The signcrypting party computing system 302 includes a network interface circuit 308, a key generation circuit 310, and a signcrypted envelope message generation circuit 312. The network interface circuit 308 is structured to facilitate operative communication between the signcrypting party computing system 302 and other systems and devices over the network 306. The signcrypting party computing system 302 may include smartphones, tablet computing systems, laptop computing systems, desktop computing systems, PDAs, smart watches, smart glasses, etc.

The key generation circuit 310 is structured to generate a CEK for encrypting the content into cipher text and a public/private key pair for the signcryption of a data element in a signcrypted envelope message. In some arrangements, a fresh CEK is generated for each signcrypted envelope message. In other arrangements involving multiple CEKs, a fresh CEK is generated for encryption of each particular content in a plurality of content. In some embodiments the public/private key pair is associated with a digital certificate in a PKI, for example, the X.509 certificate. In those embodiments, a key pair is generated (the private/public key pair must be generated together as they are mathematically related), the private key signs the public key, and the pair is submitted to the CA or the front end registration authority that will then generate that public key certificate. Alternatively, the private/public key pair could be issued with a commercial CA, for example, one associated with a financial institution or using an internally generated self-signed certificate. In some arrangements, the signcrypting party computing system 302 retrieves a public key certificate from the commercial CA and uses the certificate to ascertain the public/private key pair. In other embodiments, the key generation circuit 310 generates an ephemeral public/private key pair not associated with a digital certificate in a PKI. In these embodiments, the public key can be included in the attributes or fields of a signcrypted envelope message, allowing a digital signature verifier to use the included public key component to verify message integrity. In these arrangements, the verifier will be able to verify message integrity (e.g., that it has not been modified), but will not gain origin authenticity assurance (e.g., know who signed the message and who possessed the private key component of the key pair). In some arrangements, the key generation circuit 310 may be a part of the signcrypted envelope message generation circuit 312.

The signcrypted envelope message generation circuit 312 is structured to generate a signcrypted envelope message by retrieving the private key from the key generation circuit 310 and simultaneously digitally signing (and therefore cryptographically binding) and encrypting the hash of the cipher text, the CEK, and additional attributes specified by the protocol or message signer. The signcrypted envelope message generation circuit 312 manages the key generation circuit 310 and controls the generation of key pairs according to the desired signcrypted envelope message (e.g., whether the key is associated with a PKI, CA, etc.). Additionally, the signcrypted envelope message generation circuit 312 must retrieve the public key of the recipient party computing system 304. This may include a request to the key generation circuit 310 of the recipient party computing system 304. In other arrangements, the signcrypted envelope message generation circuit 312 will look up the recipient public key certificate registered with a CA. Once a key pair is generated and the recipient public key retrieved, the signcrypted envelope message generation circuit 312 determines additional content to be bound within a signcrypted envelope message under the digital signature. The signcrypted envelope message generation circuit 312 also determines what additional attributes or content go within a signcrypted envelope message as unsigned attributes. The signed or unsigned attributes can include, for example, a transaction identifier, a message signer identifier, and the like. The composition of a signcrypted envelope message is expanded upon further in FIG. 1. An example method of generating a signcrypted envelope message is described in greater detail above in method 200 of FIG. 2.

The recipient party computing system 304 includes a network interface circuit 314, a key generation circuit 316, and a unsigncrypt circuit 318. Generally, the recipient party computing system 304 receives a signcrypted envelope message from the signcrypting party computing system 302 and verifies the identity of the message signer. With the received signcrypted envelope message, the recipient party computing system 304 is also able to verify data integrity, origin authenticity, and non-repudiation of the content within the signcrypted envelope message and the signcrypted envelope message as a whole. Non-repudiation is achieved if the signcrypting party's public key used to generate the signcrypted envelope message is associated with a public key identity certificate associated with the signcrypting party. The network interface circuit 314 is structured to facilitate operative communication between the recipient party computing system 304 and other systems and devices over the network 306. The key generation circuit 316 is substantially similar to the key generation circuit 310 of the signcrypting party computing system 302.

The unsigncrypt circuit 318 is structured to facilitate the unsigncryption of the CEK and hash of the cipher text in a signcrypted envelope message and then subsequently decrypt the cipher text embedded in content information component of the signcrypted envelope message using the CEK to obtain the content (e.g., bulk data). In some arrangements, signcrypted attributes are recovered, for example, in the form of a manifest attribute. In some arrangements, an application or web browser on the computing system facilitates this process. For example, upon receiving a signcrypted envelope message, the recipient party computing system 304 automatically begins verification of the signature and unsigncryption of a signcrypted envelope message, and decrypts the cipher text using the retrieved CEK to retrieve the content. The content, CEK, and/or the cipher text can be in the form of a simple oblique value (a string of octets) or structured content, such as the URL address of a web service, an indication of the signcryption, encryption, or other technique that was used, and any other required data or authentication information. An example method 400 of validating a signcrypted envelope message is discussed below in FIG. 4.

Figure 4:
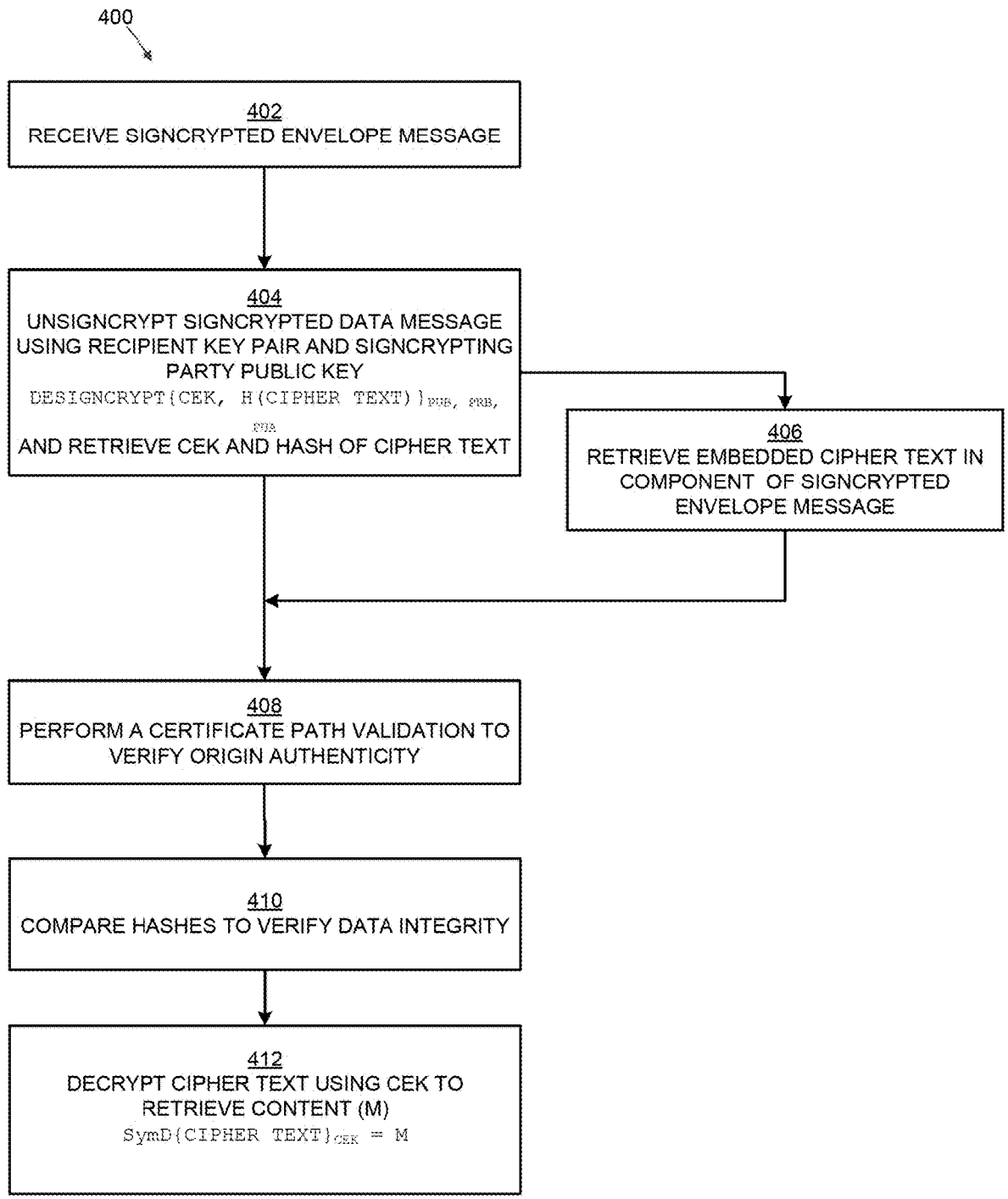
FIG. 4 is a flow diagram illustrating a method of validating a signcrypted envelope message, according to an example embodiment.

Referring to FIG. 4, a flow diagram illustrating a method 400 of validating a signcrypted envelope message is illustrated, according to an example embodiment. The method 400 is described in connection with a recipient party (e.g., message recipient) that receives an signcrypted envelope message from a signcrypting party. According to various embodiments, the recipient is an entity that manages the recipient party computing system 304 of FIG. 3, and the signcrypting party is an entity that manages the signcrypting party computing system 202 of FIG. 3. However, the method 400 may be similarly performed by other systems and devices.

The method 400 begins when the recipient receives a signcrypted envelope message, at 402. The signcrypted envelope message provides the recipient with all information needed to perform certificate path validation to gain assurance that the signcrypting party's public key certificate is trusted and to decrypt the cipher text of a signcrypting party included in the signcrypted envelope message.

At 404, the recipient unsigncrypts the signcrypted envelope message using the recipient key pair ("PUB", "PRB") and the signcrypting party public key ("PUA") and retrieves the CEK and the hash of the cipher text from the unsigncryption of the signcrypted envelope message. In some arrangements, the recipient accomplishes this by using uses an unsigncryption algorithm with the inputs of: the signcrypted envelope message, recipient private and public key pair, and the signcrypting party public key. In some arrangements, the resulting output includes a pair consisting of either a symbolic value "ACCEPT" and plaintext (e.g., unencrypted) of the CEK and the hash of the cipher text indicating a successful unsigncryption, or a symbolic value "REJECT" and the null string indicating an unsuccessful unsigncryption. In some arrangements, the value in a signcryptionValue component of type Signcrypter is unsigncrypted using the recipient's public-private key pair and signcrypting party's public key to recover the signcrypted value of type ToBeSigncrypted that contains the CEK and the hash of the cipher text.

At 406, the recipient retrieves the cipher text embedded in a component of the signcrypted envelope message. In some arrangements, the cipher text is embedded in a contentInformation component of type SigncryptedData.

At 408, the recipient performs a certificate path validation to gain assurance that the signcrypting party's public key certificate is trusted. In one arrangement, path validation is performed on the signer certificate chain back to a trust anchor. The recipient determines whether the signcrypted CEK and hash sent to the recipient is valid and trusted (e.g., that the signature itself is valid and that the certificates in the path are not on a revocation list). In some arrangements, a signcrypted envelope message includes PKI, CRLs, CA, or similar information for the recipient to track the signature back to a trust anchor/entity. For example, the recipient verifies with the public or private service provider associated with the key pair used that the public key certificate is valid. In other arrangements, the recipient can attempt to verify the signed version of the hash that the recipient has received from the sender by using the signcrypting party's public key. The verification procedure uses the signcrypting party's public key in a mathematical operation to determine whether the signature was indeed created from the same hash using the correct private key. If the verification function is successful, the signed version of the hash will be proven to have originated from the hash that the recipient has produced by applying the hash function directly to the message. A successful verification operation therefore allows the recipient to confirm the true authorship of the message and to confirm that the message has not been altered.

At 410, the recipient verifies the hash of the cipher text to gain assurance of the data integrity of the signcrypted envelope message. First, the recipient encrypts the decrypted content retrieved from the signcrypted envelope message using the CEK to generate a second cipher text. Second, the recipient generates a second hash of the second cipher text. Finally, the recipient determines data integrity of the signcrypted envelope message by verifying that the hash of the second cipher text matches the hash of the first cipher text. In some arrangements, assurance of the data integrity can be achieved by computing a hash of the encryptedContent component of type NamedKeyEncryptedData using the algorithm in the messageDigest attribute recovered from the signcrypted value of type ToBeSigncrypted and comparing the computed hash to the recovered cipher text.

At 412, the recipient decrypts the cipher text using the CEK retrieved at 406 to retrieve the content ("M").

Figure 5C:
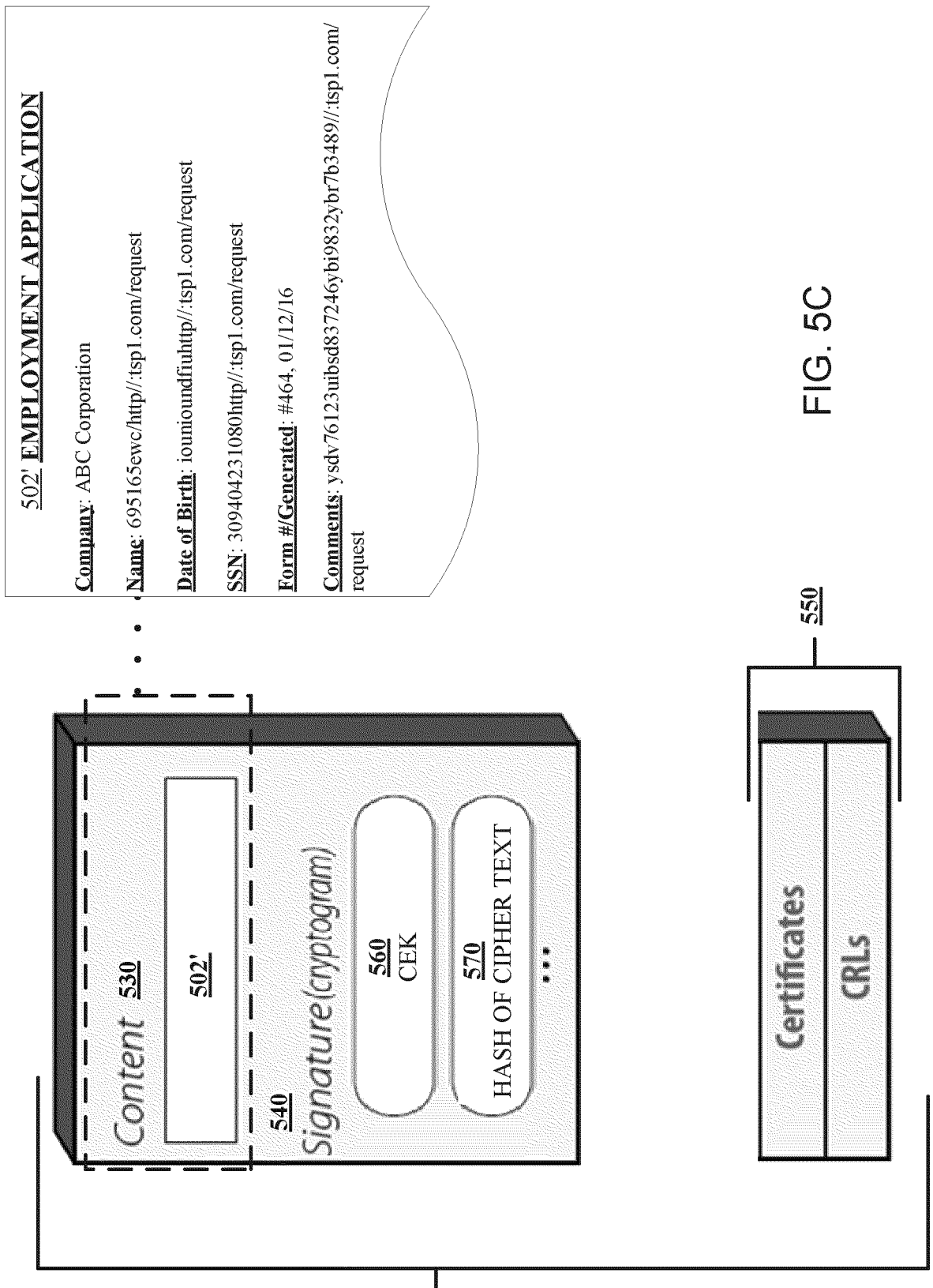

Referring to FIGS. 5A-5C, an employment application is illustrated at various instances of generating a signcrypted envelope message, according to an example embodiment. As will be appreciated, the various methods and systems described above in connection with the signcrypted envelope message can be implemented to generate the signcrypted envelope message. For example, using the signcrypted envelope message processing system 300 of FIG. 3 or implementing the method 200 of generating a signcrypted envelope message described in FIG. 2, a file of any type can be selectively redacted and transferred securely to one or more recipients.

FIGS. 5A-5C refer to a hypothetical employment application 502 that is submitted to the hiring department of a corporation and shared on a public cloud. As shown below, the application's sensitive content is encrypted and embedded in a component of a signcrypted envelope message before being placed on the cloud where it can be retrieved from the cloud and unsigncrypted by authorized entities that possess the recipient key pair (e.g., the HR department of the company). As will be appreciated, the file may be of any type, for example, a Microsoft Excel document, JPEG, text document, pdf file, and the like. A signcrypted envelope message manifest may be generated that includes a plurality of information object identifiers, an encryption schema, and a key pair. The signcrypted envelope message manifest can dictate how the content owner identifies the data elements that need to be restricted. For example, the signcrypted envelope message manifest may be pre-constructed to only allow the content owner redacting an image file to drag and click boxes over the content, for example, by using an Abstract Syntax Notation One ("ASN.1") module to define an XML Manifest Type that uses XML Path ("XPath") to locate elements to be redacted. Alternatively, the signcrypted envelope message manifest may be dynamic, allowing the content owner to choose a redaction method, which is implemented by the signcrypted envelope message manifest. The identification may include a user-interface that allows for a point-click, drag and drop, or similar selection methods. Alternatively, the signcrypted envelope message manifest may support identification through a detailed description (e.g., "please encrypt the head and neck of the middle person), a location-based (e.g., the second page of the text file will be encrypted), a coordinate pairing, or a similar identification mechanism. In some arrangements, the content owner may allow for the signcrypted envelope message manifest to randomly redact content in the file. For example, the random redaction may be preferable where the content is sufficiently unusable or protected if any content is redacted.

As shown in FIG. 5A, an employment application 502 submitted to ABC corporation for a potential job containing the original, unrestricted data elements is illustrated, according to an example embodiment. The document contains multiple information fields 504, including the company name field, applicant information fields, form generation field and comments field regarding comments about the applicant's qualifications. The entity that is in possession of the employment application 502 submits a request to encrypt some field entries of the application. In some arrangements, the encryption could be a specific algorithm associated with a document such that the same information fields are encrypted every time. In other arrangements, the signcrypted envelope message manifest may be implemented after the generation of the document with each information field being processed into a selectable data element that can be encrypted.

Turning to FIG. 5B, an encrypted (e.g., redacted) employment application 502' of the employment application 502 is illustrated, according to an example embodiment. The encrypted employment application 502' encryption involves encrypting the selected content with a CEK and a symmetric encryption algorithm. At the completion of the encryption, the encrypted employment application 502' is such that unauthorized viewers cannot access the encrypted employment application 502' specific information without access to the CEK. The redacted document as shown has encrypted the applicant information fields and the comment field and is ready to be displayed on the shared server or location, for example, on a cloud interface or a blockchain.

In some arrangements, multiple CEKs could be generate the encrypted employment application 502', such that each CEK encrypts different portions of the encrypted employment application 502'. In those arrangements, a single signcrypted envelope message is generated with each of the CEK and hash of the encrypted employment application 502' signcrypted using the signcrypting party's public/private key pair and the public key of the recipient that should have access to each respective CEK. In other arrangements, a single CEK encrypts the encrypted employment application 502' and multiple seals are generated for a single signcrypted envelope message. In those arrangements, a seal is generated for each of the respective recipients by signcrypting each of the CEK and hash of the encrypted employment application 502' using the signcrypting party's public/private key pair and the respective recipient's public key.

Turning to FIG. 5C, a signcrypted envelope message 520 with the encrypted employment application 502' embedded in a content component 530 of the signcrypted envelope message 520 is illustrated, according to an example embodiment. The signcrypted envelope message 520 may be one generated using method 200 of FIG. 2. As shown in FIG. 5C, the signcrypted envelope message 520 includes a content component 530, a signcryption component 540, and optional unsigned attributes 550.

Generally, the signcrypted envelope message 520 is the output by the signcryption algorithm that simultaneously signs and encrypts the plurality of inputs. The signcrypted envelope message 520 includes a signcryption component 540 over the CEK 560 and hash of the cipher text 570. The CEK 560 was used to encrypt the employment application 502 in FIG. 5B to generate the encrypted employment application 502'. The hash of the cipher text 570 is a hash of the encrypted employment application 502'. The signcrypting party key pairs and recipient public key are used to signcrypt the information. In some embodiments, the signcrypting party identifies these two key pairs in either within the signed portion of the signcrypted envelope message 520 or in the unsigned attributes 550 of the signcrypted envelope message 520. Each key pair is typically associated with a public key identity certificate so that non-repudiation services are possible. The plaintext of the encrypted employment application 502' is embedded in the content component 530 of the signcrypted envelope message 520. As will be appreciated, if no additional unsigned attributes 550 are included in the signcrypted envelope message 520, the signcrypted envelope message 520 will just include the content component 530 and a CEK 560 and hash of the cipher text 570 under a signcryption component 540.

The content component 530 includes at least the encrypted employment application 502'. In some arrangements, the content component 530 may include a KeyName or other information of the CEK used to encrypt the original employment application 502. The content component 530 may also include a file type, record, image, or other content that is associated with the signcrypting party or the hash of the signcrypting party's X.509 certificate. Any number of attributes of any type or format can be bound to the content by the signcryption component 540. For example, the additional attributes can include a PKI, a digital signing factor, or a signature key (e.g., a key that includes a set of private data elements specific to the signcrypting party).

In some arrangements, the signcrypted envelope message 520 may include a list of signcrypted components can be carried in a signed attribute. The format and the information contained in the list varies with the type of content. XPath expressions can be used to locate any signcrypted element in any XML-instance document. To identify the signcrypted components in an WL-instance document, a set of)(Path expressions can be used to identify the location of each signcrypted element. When the contents of an XML element are signcrypted, the sender includes the outer markup tags in the signcryption operation. These outer tags are not removed from the document, since they are used to locate the element using)(Path. The markup between these outer tags is replaced with a character string representation of the signcryption results (e.g., a value of XML type base64Binary). This XML type may be used to represent arbitrary Base64-encoded binary data. A message recipient uses the list of)(Path expressions to locate the tags in an WL-instance document that contains signcrypted data. The signature on each signcrypted object can then be verified and its plaintext content recovered. The recovered plaintext can then be used to replace the cryptogram with the recovered XML markup prior to XML schema validation.

In some arrangements, the signcrypted envelope message 520 includes unsigned attributes 550. The unsigned attributes 550 can include, for example, optional certificates and CRLs that may be sent along with the signcrypted envelope message 520. In other arrangements, the certificates and CRLs may be added in the content component 530 or stored under the signcryption encryption component 540.

After generation of the signcrypted envelope message 520 an entity with access to the signcrypted envelope message 520 and the recipient key pair can unsigncrypt the signcrypted envelope message 520 and then subsequently decrypt (e.g., de-redact) the encrypted employment application 502' using the CEK 560 to retrieve the original, decrypted, employment application 502. As will be appreciated, once the original employment application 502 is retrieved the recipient may subsequently encrypt the employment application 502 and generate a new signcrypted envelope message 520 using a new or the same recipient key pair. This could be because the entity in FIG. 5C would like to share the applicant information fields of the employment application 502 with outside entities, but restrict the information regarding the applied for company or the company's comments on the applicant. For example, John Doe is being submitted as an applicant to a similar, but different company, to the "ABC Corporation" such that the entity sharing the information would like to give the details of the applicant without disclosing where the applicant has also applied to. This use would be beneficial for sharing resumes and employment applications on a central server, while allowing for company specific information to be redacted depending on the situation.

In some arrangements, a single signcrypted envelope message 520 can include content that is encrypted for two different parties. First CEK associated with a first signcrypted envelope message manifest is generated and a second CEK associated with a second signcrypted envelope message manifest is generated. For example, a first message component is generated that contains the first CEK is generated for recipient X. A second message component is generated that contains the second CEK is generated for recipient Y. Accordingly, a single signcrypted envelope message 520 can be sent to both recipient X and recipient Y and each respective recipient would only be able to unsigncrypt and access the message component that was intended for them.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor that, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data that cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, video and audio recording devices, a keyboard, a keypad, a mouse, joystick or other input devices performing a similar function. Comparatively, the term "output device," as described herein, may include any type of output device including, but not limited to, a computer monitor, printer, facsimile machine, electroencephalogram, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments.

Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed:

1. A method, comprising:
generating, by a message computing system, a first symmetric content encryption key and a second symmetric content encryption key;
encrypting, by the message computing system, a first portion of content using the first symmetric content encryption key and a second portion of content using the second symmetric content encryption key to generate cipher text including the encrypted first portion of content and the encrypted second portion of content;
generating, by the message computing system, a hash of the cipher text;
signcrypting, by the message computing system, the hash and the first symmetric content encryption key using each of a signcrypting party public key, a signcrypting party private key, and a first recipient public key to generate a first signcrypted envelope message component;
signcrypting, by the message computing system, the hash and the second symmetric content encryption key using each of the signcrypting party public key, the signcrypting party private key, and a second recipient public key to generate a second signcrypted envelope message component;
generating, by the message computing system, a signcrypted envelope message including the first signcrypted envelope message component and the second signcrypted envelope message component, wherein the cipher text is embedded in a content information component of the signcrypted envelope message; and
transmitting, by the message computing system, the signcrypted envelope message to a first recipient associated with the first recipient public key and a second recipient associated with the second recipient public key,
wherein the first recipient can unsigncrypt the first signcrypted envelope message component using each of a first recipient private key and the signcrypting party public key to retrieve the first symmetric content encryption key and the hash of the cipher text, wherein the second recipient can unsigncrypt the second signcrypted envelope message component using each of a second recipient private key and the signcrypting party public key to retrieve the second symmetric content encryption key and the hash of the cipher text, wherein the first recipient can decrypt the encrypted first portion of content of the cipher text in the content information component of the signcrypted envelope message using the first symmetric content encryption key, wherein the second recipient can decrypt the encrypted second portion of content of the cipher text in the content information component of the signcrypted envelope message using the second symmetric content encryption key, wherein origin authenticity of the cipher text can be determined by the first recipient using each of the signcrypting party public key and the first recipient public and private keys and by the second recipient using each of the signcrypting party public key and the second recipient public and private keys, and wherein data integrity of the cipher text, the first symmetric content encryption key, and the second symmetric content encryption key can be verified via the hash of the cipher text.

2. The method of claim 1, wherein the first signcrypted envelope message component further includes a first signcryption algorithm identifier of a first signcryption algorithm used in signcrypting the hash and the first content encryption key, the first signcryption algorithm identifier embedded in the content information component of the signcrypted envelope message.

3. The method of claim 1, wherein the signcrypted envelope message further includes a first unsigncryption algorithm identifier of a first unsigncryption algorithm that can be used by the first recipient to unsigncrypt the signcrypted envelope message, the first unsigncryption algorithm identifier embedded in the content information second component of the signcrypted envelope message.

4. The method of claim 1, wherein embedding the cipher text in the content information component of the signcrypted envelope message comprises:

storing, by the message computing system, the cipher text in a contentInformation component of a NamedKey-EncryptedData type, wherein the contentInformation is embedded in the content information component of the signcrypted envelope message.

5. The method of claim 4, further comprising, prior to signcrypting:

storing, by the message computing system, a name of the first content encryption key in a keyName component of a NamedKeyEncryptedData type of the signcrypted envelope message.

6. The method of claim 5, further comprising, prior to signcrypting:

storing, by the message computing system, an identifier of a symmetric encryption algorithm and any associated parameters used to generate the cipher text in an encryptedContentInfo component of the NamedKey-EncryptedData type of the signcrypted envelope message.

7. The method of claim 1, further comprising:

validating, by the message computing system, a certificate of the signcrypting party public key back to a trust anchor.

8. A method, comprising:

receiving, by a first recipient computing system, a signcrypted envelope message from a signcrypting party, the signcrypted envelope message comprising a hash, a first content encryption key, and a second content encryption key, wherein the hash and the first content encryption key are signcrypted using each of a signcrypting party public key, a signcrypting party private key, and a first recipient public key of a first recipient associated with the first recipient computing system to generate a first signcrypted envelope message component, wherein a cipher text is embedded in a content information component of the signcrypted envelope message, the cipher text is generated by using the first content encryption key to encrypt a first portion of content and using the second content encryption key to encrypt a second portion of content, and the hash is a hash of the cipher text;

unsigncrypting, by the first recipient computing system, the first signcrypted envelope message component using each of a first recipient private key of the first recipient and the signcrypting party public key to retrieve the first content encryption key and the cipher text; and decrypting, by the first recipient computing system, the encrypted first portion of content of the cipher text with the first content encryption key to retrieve the first portion of content, wherein the second content encryption key is signcrypted using each of the signcrypting party public key, the signcrypting party private key, and a second recipient public key of a second recipient associated with a second recipient computing system, such that the first recipient is unable to decrypt the encrypted second portion of content of the cipher text, wherein origin authenticity of the cipher text can be determined by the first recipient using each of the signcrypting party public key and the first recipient public and private keys, and wherein data integrity of the cipher text and the first content encryption key can be verified via the hash of the cipher text.

9. The method of claim 8, further comprising:

validating, by the first recipient computing system, the cipher text with the first content encryption key by verifying the hash of the cipher text.

10. The method of claim 8, further comprising:

validating, by the first recipient computing system, a certificate of the signcrypting party public key back to a trust anchor.

11. The method of claim 8, wherein the hash is a first hash and wherein the cipher text is a first cipher text, and further comprising:

generating, by the first recipient computing system, a second hash of a second cipher text, wherein the data integrity of the cipher text is verified if the second hash matches the first hash.

12. At least one non-transitory machine-readable medium comprising processor-readable instructions that, when executed, cause at least one processor to:

generate a first symmetric content encryption key and a second symmetric content encryption key;

encrypt a first portion of content using the first symmetric content encryption key and a second portion of content using the second symmetric content encryption key to generate cipher text including the encrypted first portion of content and the encrypted second portion of content;

generate a hash of the cipher text;

signcrypt the hash and the first symmetric content encryption key using each of a signcrypting party public key, a signcrypting party private key, and a first recipient public key to generate a first signcrypted envelope message component;

signcrypt the hash and the second symmetric content encryption key using each of the signcrypting party public key, the signcrypting party private key, and a second recipient public key to generate a second signcrypted envelope message component;

generate a signcrypted envelope message including the first signcrypted envelope message component and the second signcrypted envelope message component, wherein the cipher text is embedded in a content information component of the signcrypted envelope message; and transmit the signcrypted envelope message to a first recipient associated with the first recipient public key and a second recipient associated with the second recipient public key, wherein the first recipient can unsigncrypt the first signcrypted envelope message component using each of a first recipient private key and the signcrypting party public key to retrieve the first symmetric content encryption key and the hash of the cipher text, wherein the second recipient can unsigncrypt the second signcrypted envelope message component using each of a second recipient private key and the signcrypting party public key to retrieve the second symmetric content encryption key and the hash of the cipher text, wherein the first recipient can decrypt the encrypted first portion of content of the cipher text in the content information component of the signcrypted envelope message using the first symmetric content encryption key, wherein the second recipient can decrypt the encrypted second portion of content of the cipher text in the content information component of the signcrypted envelope message using the second symmetric content encryption key, wherein origin authenticity of the cipher text can be determined by the first recipient using each of the signcrypting party public key and the first recipient public and private keys and by the second recipient using each of the signcrypting party public key and the second recipient public and private keys, and wherein data integrity of the cipher text, the first symmetric content encryption key, and the second symmetric content encryption key can be verified via the hash of the cipher text.

13. The at least one non-transitory machine-readable medium of claim 12, wherein the first signcrypted envelope message component further includes a first signcryption algorithm identifier of a first signcryption algorithm used in signcrypting the hash and the first content encryption key, the first signcryption algorithm identifier embedded in the content information component of the signcrypted envelope message.

14. The at least one non-transitory machine-readable medium of claim 12, wherein the signcrypted envelope message further includes a first unsigncryption algorithm identifier of a first unsigncryption algorithm that can be used by the first recipient to unsigncrypt the signcrypted envelope message, the first unsigncryption algorithm identifier embedded in the content information component of the signcrypted envelope message.

15. The at least one non-transitory machine-readable medium of claim 12, wherein embedding the cipher text in the content information component of the signcrypted envelope message comprises:

storing the cipher text in a contentInformation component of a NamedKeyEncryptedData type, wherein the contentInformation is embedded in the content information component of the signcrypted envelope message.

16. The at least one non-transitory machine-readable medium of claim 15, wherein the instructions further cause the at least one processor to:

prior to signcrypting, store a name of the first content encryption key in a keyName component of a NamedKeyEncryptedData type of the signcrypted envelope message.

17. The at least one non-transitory machine-readable medium of claim 16, wherein the instructions further cause the at least one processor to:

prior to signcrypting, store an identifier of a symmetric encryption algorithm and any associated parameters used to generate the cipher text in an encryptedContentInfo component of the NamedKeyEncryptedData type of the signcrypted envelope message.

18. The at least one non-transitory machine-readable medium of claim 12, wherein the instructions further cause the at least one processor to:

validate a certificate of the signcrypting party public key back to a trust anchor.

* * * * *